UNITED STATES PATENT OFFICE.

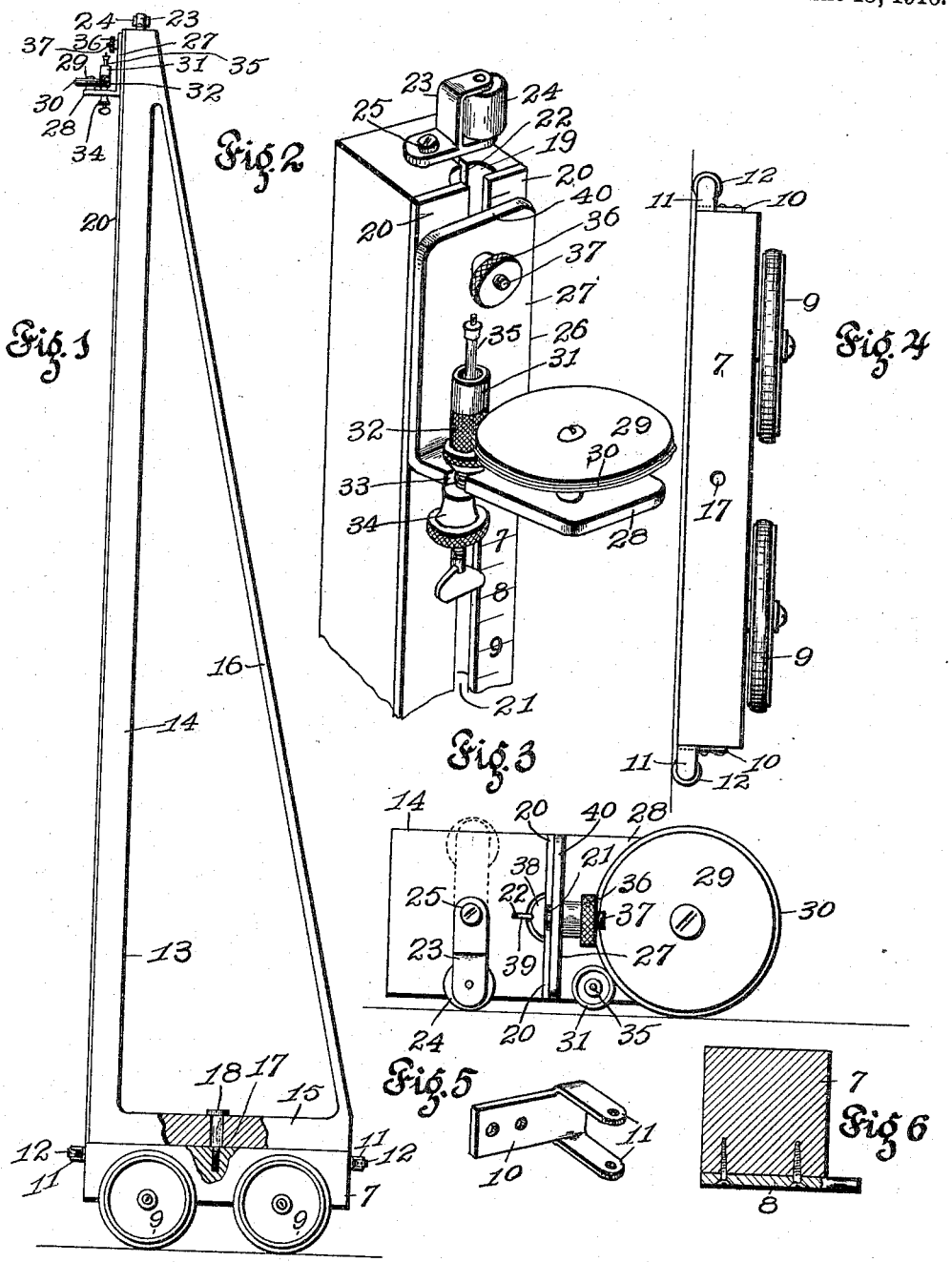

HENRY C. WALKER, OF KIRKWOOD, MISSOURI.

BLACKBOARD-RULING DEVICE.

1,186,716. Specification of Letters Patent. Patented June 13, 1916.

Application filed March 24, 1915. Serial No. 16,667.

*To all whom it may concern:*

Be it known that I, HENRY C. WALKER, a citizen of the United States, and resident of Kirkwood, Missouri, have invented certain new and useful Improvements in Blackboard-Ruling Devices, of which the following is a specification.

This invention relates to improvements in a blackboard ruling device, and has for its object a swivel standard mounted on a truck and a self-inking or marking device adjustably mounted on a standard, and guide rollers for properly guiding the device against the surface of the black-board or other article to be lined up.

A further object of my invention is to construct a device which is light and durable and can be operated on the chalk ledge of an ordinary school black-board, and by which device lines may be properly drawn on the face of the board and each line being properly spaced apart by means of graduations located on the face of the swivel standard.

Figure 1, is a side elevation of my complete invention. Fig. 2, is a detail perspective view of the upper portion of the device showing the construction of the standard and the proper position of the marking or ruling mechanism in connection thereof. Fig. 3, is a top plan view of the same. Fig. 4, is a detail top plan view of the truck with the swivel standard removed. Fig. 5, is a detail perspective view of one of the guide roller brackets located on the truck for supporting the same a reasonable distance from the surface of the black-board. Fig. 6, is a cross-sectional view of the truck showing the axle on which one of the truck wheels is supported.

In carrying out my invention I provide a truck frame 7, arranged preferably rectangular in form and on the truck are supported axles 8; and on these axles are preferably mounted truck wheels 9, their periphery being properly equipped with a tire of some resilient material such as rubber or the like. These wheels being located to one side of the truck frame are designed to ride on the chalk ledge of a black-board which chalk ledge is located at the bottom of the board the same as the ordinary construction as that arranged on black-boards in the ordinary educational institutions.

Conveniently located on the truck frame 7, are brackets 10, which have projecting ears 11, and between the same are axially mounted guide rollers 12, which rollers are so positioned and adjusted as to project slightly beyond the surface of the truck frame on which the wheels 9 are mounted, in order to prevent the frame from scraping against the surface of the black-board.

On the top of the truck frame 7, is mounted a standard 13, consisting of a vertical portion 14, a horizontal portion 15, and a brace portion 16. This standard is swivelly mounted on the truck frame at the point indicated by the numeral 17, and supported by a stud 18; and by means of this swivel the standard may be reversed to a position opposite to that position shown in Fig 1; that is bringing the vertical member to the right instead of the left as shown. The front surface of the vertical member is provided with a groove 19, this groove extending from the top to the bottom, and on the face of the standard and on each side of the groove are firmly fastened metallic strips 20, the surface of which is provided with graduations in inches and fractions thereof. The said strips are arranged to project partially over the edges of the groove 19 of the vertical member, forming a slot 21. The rear surfaces of the strips act as a guide and locking surface for the head of a lock-nut or set-screw which forms a part of the marking or ruling mechanism, the construction of which will be hereinafter fully described in detail. The vertical member 14, is likewise provided with a groove 22, which extends beyond the depth of the groove 19, and in which is seated a wing formed on the head of the lock-nut or fastening screw.

On the upper end or extreme top of the vertical member 14, is located a bracket 23, in which is mounted a guide roller 24, said bracket being pivoted at the point indicated by the numeral 25, and arranged so that the bracket together with the supporting roller may be shifted from one side to the other as that shown by solid and dotted lines in Fig. 3.

I will now describe in detail the construction of the marking or ruling device, the same being clearly illustrated in the perspective view in Fig. 2. This mechanism consists of a bracket 26, having a vertical portion 27, and a horizontal portion 28. On the horizontal portion is mounted a marking or ruling disk 29; its periphery being equipped with a thin, durable yet partially pliable substance 30, which contacts with the surface of the blackboard and makes a thin solid line.

On the horizontal portion 28, is located a feeding tube 31, in which is placed the substance preferably of a liquid nature and of any color, and a portion of the tube is provided with a sleeve 32, and of absorbent material which absorbs a certain amount of the fluid and which is fed from the tube 31, by means of perforations or otherwise formed in the said tube. Against this absorbent material contacts the periphery of the marking disk, and is automatically supplied with the fluid when the disk is in rotation against the surface of the board when the device is drawn on its truck over the chalk edge.

The fluid tube is supported in the slot 33, formed in the bracket and held in position by the lock-nut 34, and by the manipulations of which the tube can be properly adjusted, and removed or replaced at will. The interior of the tube is provided with a valve stem 35, by which the flow of the fluid is regulated and the construction of which is of the ordinary handle valve type.

The vertical member 27, of the bracket is supported against the surface of the vertical member 14, and held in proper adjustment or set-position by a lock-nut 36, and tightening screw 37, which extends through the bracket; its opposite end being provided with a head 38, and a flattened wing or ear 39; this head is of a size sufficient to operate freely in the groove 19, and the screw is prevented from turning when applying the tightening nut 36 by the flattened wing 39 extending into the groove 22.

The marking or ruling mechanism just described may be adjusted on the standard in accordance to the graduations, the distance being properly regulated by bringing the upper surface or edge 40 in line with one of the graduations on the face plates. In this manner lines can be drawn at any distance apart in inches or fractions thereof.

The purpose of the swivel feature is that when the device is placed in operation to line a black-board it is drawn against the surface commencing at one side and that portion of the surface which remains unruled on account of the extension of the truck is then continued and the lines completed by swiveling the frame bringing the marking disk on the opposite side of the frame.

This device may be used for other purposes besides lining black-boards, as for sign-painting and the like.

Having fully described my invention what I claim is:

1. A black-board ruling device comprising a traveling truck, a standard swivelly mounted thereon, the one face of said standard being provided with graduations; an adjustable marking device mounted on the standard, said marking device provided with an automatic feed which supplies the marker with fluid for properly imprinting a mark on the board, substantially as specified.

2. A device of the class described, comprising a truck, wheels and guide rollers mounted thereon, the wheels operating on the chalk ledge of the black-board and the rollers contacting with the surface of the board; a standard swiveled on the truck; an adjustable marking device located on the standard, and a guide roller mounted on the top of the standard to properly space the device from the surface of the board on which the lines are to be marked, substantially as specified.

3. A device of the class described, comprising a standard, a truck on which said standard is swiveled; a guide roller mounted on the top of the standard, a marking mechanism adjustably mounted on the standard, and a fluid feeding mechanism for supplying fluid to the marking mechanism automatically during the rotation thereof, substantially as specified.

4. A device of the class described, comprising a standard, a truck, wheels and guide rollers mounted on said truck for conveying the device on the chalk ledge of a blackboard, means for permitting the standard to swivel on the truck, and an adjustable self feeding marking mechanism located on the standard, and a means for locking the same at its proper adjustment, substantially as specified.

In testimony whereof, I have signed my name to this specification, in presence of two subscribing witnesses.

HENRY C. WALKER.

Witnesses:
ALFRED A. EIRICKS,
WALTER C. STEIN.

Copies of this patent may be obtained for five cents each, by addressing the "Commissioner of Patents, Washington, D. C."